United States Patent
Jin et al.

(10) Patent No.: US 12,205,265 B2
(45) Date of Patent: Jan. 21, 2025

(54) ARTIFICIAL INTELLIGENCE SERVER

(71) Applicant: LG Electronics Inc., Seoul (KR)

(72) Inventors: Moonsub Jin, Seoul (KR); Jihye Kim, Seoul (KR); Jinsung Park, Seoul (KR); Jiyoung Huh, Seoul (KR); Beomoh Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 17/626,407

(22) PCT Filed: Jul. 11, 2019

(86) PCT No.: PCT/KR2019/008601
§ 371 (c)(1),
(2) Date: Jan. 11, 2022

(87) PCT Pub. No.: WO2021/006405
PCT Pub. Date: Jan. 14, 2021

(65) Prior Publication Data
US 2022/0254006 A1    Aug. 11, 2022

(51) Int. Cl.
*G06V 10/764* (2022.01)
*G06N 3/045* (2023.01)
(Continued)

(52) U.S. Cl.
CPC .......... *G06T 7/0004* (2013.01); *G06N 3/045* (2023.01); *G06V 10/764* (2022.01);
(Continued)

(58) Field of Classification Search
CPC .............. G06N 3/045; G06N 3/08; G06T 2207/20084; G06T 7/0004; G06V 10/764;
(Continued)

(56) References Cited

U.S. PATENT DOCUMENTS 7,813,822 B1 * 10/2010 Hoffberg .............. H04N 7/163
381/73.1
11,216,729 B2 * 1/2022 Chien .................. G06V 10/764
(Continued)

FOREIGN PATENT DOCUMENTS

CA    2761463 C  * 11/2019  .............. F24F 11/30
KR    20120092937       8/2012
(Continued)

OTHER PUBLICATIONS

Office Action in Korean Appln. No. 10-2022-7001406, mailed on Apr. 7, 2023, 18 pages(with English translation).

*Primary Examiner* — Tsung Yin Tsai
(74) *Attorney, Agent, or Firm* — Fish & Richardson P.C.

(57) ABSTRACT

An artificial intelligence server includes: a communication interface configured to communicate with a terminal, and a processor. The processor is configured to receive, from the terminal through the communication interface, a video of a home appliance, acquire a first feature vector by inputting image data extracted from the video to an image classification model, acquire a second feature vector by inputting sound data extracted from the video to a voice classification model, acquire a result value by inputting a data set obtained by combining the first feature vector and the second feature vector to an abnormality classification model, and transmit, to the terminal through the communication interface, a failure type acquired based on the result value.

20 Claims, 10 Drawing Sheets

(51) Int. Cl.
*G06T 7/00* (2017.01)
*G06V 10/774* (2022.01)
*G06V 10/82* (2022.01)
*G10L 15/16* (2006.01)

(52) U.S. Cl.
CPC ............ *G06V 10/774* (2022.01); *G06V 10/82* (2022.01); *G10L 15/16* (2013.01)

(58) Field of Classification Search
CPC ...... G06V 10/774; G06V 10/82; G06V 20/44; G06V 20/60; G10L 15/16; G10L 25/30; G10L 25/51
See application file for complete search history.

(56) References Cited

U.S. PATENT DOCUMENTS

| | | | |
|---|---|---|---|
| 2017/0178311 A1 | 6/2017 | Pal | |
| 2020/0034688 A1* | 1/2020 | Lim | G06N 3/08 |
| 2020/0096253 A1* | 3/2020 | Han | G08B 21/182 |
| 2020/0213006 A1* | 7/2020 | Graham | H04B 10/116 |
| 2020/0240662 A1* | 7/2020 | Picardi | F24F 11/37 |
| 2021/0042618 A1* | 2/2021 | Choung | G06N 3/08 |
| 2021/0152389 A1* | 5/2021 | Park | G06F 18/2413 |
| 2021/0157312 A1* | 5/2021 | Cella | G01M 13/045 |
| 2021/0201089 A1* | 7/2021 | Lin | G06V 10/82 |
| 2022/0120026 A1* | 4/2022 | Mashal | D06F 34/18 |

FOREIGN PATENT DOCUMENTS

| | | |
|---|---|---|
| KR | 10-2019-0043258 | 4/2019 |
| KR | 10-2019-0055526 | 5/2019 |
| KR | 20190077771 | 7/2019 |
| WO | WO2019078515 | 4/2019 |

* cited by examiner

FIG. 6
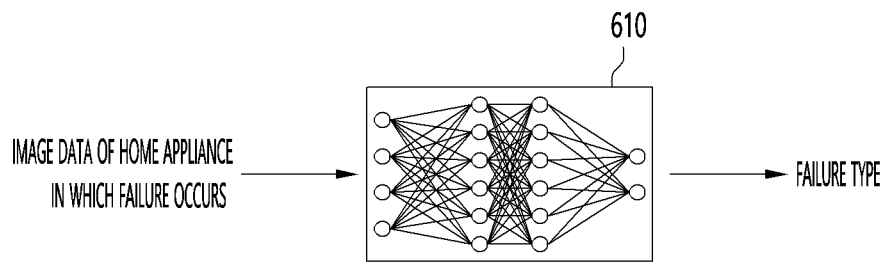
(a)
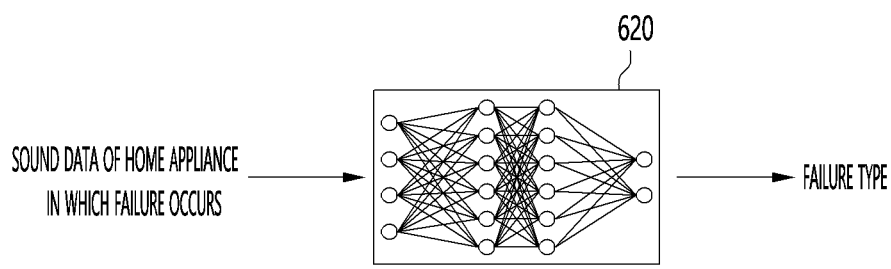
(b)
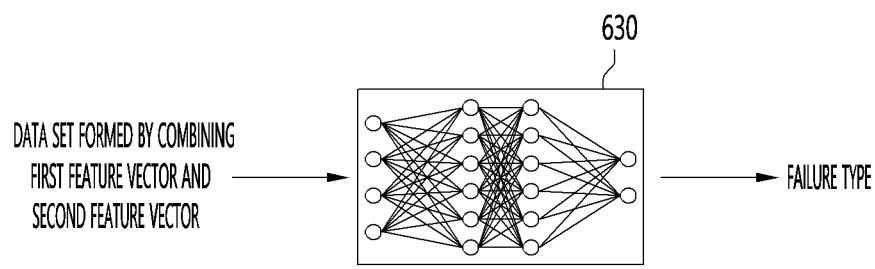
(c)

ARTIFICIAL INTELLIGENCE SERVER

CROSS-REFERENCE TO RELATED APPLICATIONS

This application is a National Stage application under 35 U.S.C. § 371 of International Application No. PCT/KR2019/008601, filed on Jul. 11, 2019. The disclosure of the prior application is incorporated by reference in its entirety.

TECHNICAL FIELD

The present disclosure relates to an artificial intelligence server for accurately determining a failure type using a video of a home appliance by using a classification model trained via a multi-modal learning method using image data and sound data.

BACKGROUND ART

Artificial intelligence (AI) refers to one field of computer engineering and information technology of studying a method for making a computer think, learn, and do self-improvement, which is achieved based on human intelligence, and means that a computer emulates an intelligent behavior of the human.

AI is largely related directly and indirectly to other fields of a computer science rather than existing itself. In particular, AI elements have been modernly introduced in various fields of information technology, and there has been an active attempt to use AI to overcome problems of the fields.

Research has been actively conducted into technology of recognizing and learning a surrounding situation using AI and providing information desired by a user in the desired form or performing an operation or function desired by the user.

When failure occurs in a home appliance, various services are present to identify a type of the failure and to provide a solution to a customer.

Examples of the services include a service center that identifies a type of failure through phone conversations with a customer or a chatbot service that identifies a type of failure while asking and answering a question with a customer through a text.

However, there is a limitation in that it is difficult to accurately convey the state of a home appliance using a language or a text, and there is a problem in that many questions and answers are required to convey the state of a home appliance.

DISCLOSURE

Technical Problem

The present disclosure provides an artificial intelligence server for accurately determining a failure type using a video of a home appliance by using a classification model trained via a multi-modal learning method using image data and sound data.

Technical Solution

According to an embodiment of the present disclosure, an artificial intelligence server includes a communication interface configured to communicate with a terminal of a user, and a processor configured to receive a video of a home appliance from the terminal, to acquire a first feature vector by inputting image data extracted from the video to an image classification model, to acquire a second feature vector by inputting sound data extracted from the video to a voice classification model, to acquire a result value by inputting a data set obtained by combining the first feature vector and the second feature vector to an abnormality classification model, and to transmit a failure type acquired based on the result value to the terminal.

According to an embodiment of the present disclosure, a method of generating a failure determination model includes generating an image classification model by training a first neural network using image data of a video of a home appliance and a failure type labeled to the image data, generating a voice classification model by training a second neural network using sound data of the video of the home appliance and a failure type labeled to the sound data, and generating an abnormality classification model by training a third neural network using a 'data set obtained by combining a first feature vector output from the image classification model and a second feature vector output from the voice classification model' and a failure type labeled to the data set.

Advantageous Effects

According to the present disclosure, a user may be advantageously provided with diagnosis of a type of failure through a simple operation of capturing and transmitting a video of a home appliance in which failure occurs.

There may be a failure type that is not capable of being determined only with an image, and there may be a failure type that is not capable of being determined only with voice. In addition, there may be a case in which it is difficult to accurately determine a failure type only with the image, and there may be a case in which it is difficult to accurately determine a failure type only with voice. However, according to the present disclosure, since a failure type is determined in consideration of both the image and the voice of a home appliance in which failure occurs, advantageously, the accuracy of diagnosis of a failure type may be improved or a failure type that is not capable of being determined only with the image or the voice.

According to the present disclosure, a failure type may not be diagnosed using a video itself, and instead, a failure type may be predicted by extracting the first feature vector based on image data and the second feature vector based on voice data and then inputting the image data and the voice data to the abnormality classification model again. That is, refined data may be input to the abnormality classification model, thereby advantageously improving prediction accuracy.

In addition, according to the present disclosure, the probability of the normal operation state may be additionally predicted and may be used to determine whether failure occurs, thereby advantageously improving prediction accuracy.

DESCRIPTION OF DRAWINGS

FIG. 6 is a diagram for explaining a training method of a failure determination model according to an embodiment of the present disclosure.

BEST MODE

Figure 1:
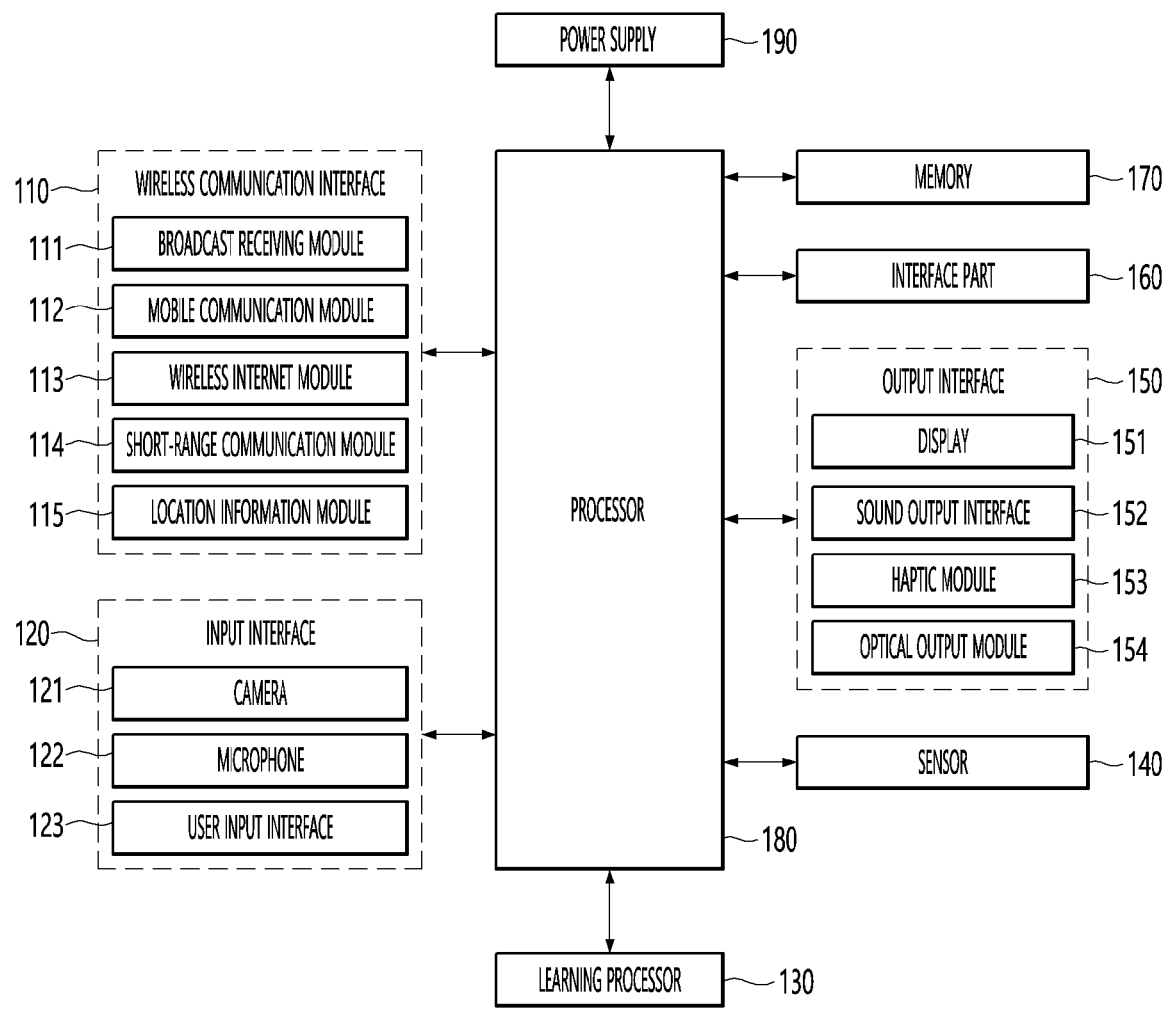
FIG. 1 is a block diagram illustrating a configuration of a terminal 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the present disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. It will be further understood that the terms "comprises" or "comprising" when used in this specification, specify the presence of stated features, integers, steps, operations, elements, or components, but do not preclude the presence or addition of one or more other features, integers, steps, operations, elements, components, or groups thereof.

In implementing the present disclosure, components may be subdivided for convenience of description, but these components may be implemented in one device or module, or one component may include a plurality of devices or modules or may be implemented by being divided into fields.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the present disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

Artificial intelligence refers to one field of computer engineering and information technology of studying a method for making a computer think, learn, and do self-improvement, which is achieved based on human intelligence, and means that a computer emulates an intelligent behavior of the human.

AI is largely related directly and indirectly to other fields of a computer science rather than existing itself. In particular, AI elements have been modernly introduced in various fields of information technology, and there has been an active attempt to use AI to overcome problems of the fields.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

A general single layer neural network is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summed. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network has a configuration that is specified by a configuration of a model, an activation function, a loss function or a cost function, a learning algorithm, an optimization algorithm, or the like, a hyperparameter may be preset before learning, and then, a model parameter may be set through learning to specify information.

For example, a factor for determining a configuration of the artificial neural network may include the number of hidden layers, the number of hidden nodes included in each hidden layer, an input feature vector, a target feature vector, or the like.

The hyperparameter may include various parameters that need to be initially set for learning, such as an initial value of the model parameter. The model parameter may include various parameters to be determined through learning.

For example, the hyperparameter may include a weight initial value between nodes, a bias initial value between nodes, a size of mini-batch, a number of repetitions of learning, a learning rate, or the like. The model parameter may include a weight between nodes, bias between nodes, or the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use mean square error (MSE) or cross entropy error (CEE), but the present disclosure is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, Nesterov Accelerate Gradient (NAG), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

In this case, the step size may refer to a learning rate.

The GD may partially differentiate the loss function with each of model parameters to acquire gradients and may change and update the model parameters by the learning rate in the acquired gradient direction.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of a terminal 100 according to an embodiment of the present disclosure.

The terminal 100 may be embodied as a fixed type device, a mobile device, or the like, which includes a mobile phone, a projector, a mobile phone, a smart phone, a laptop computer, a digital broadcast terminal, a personal digital assistants (PDA), a portable multimedia player (PMP), a navigation device, a slate personal computer (PC), a tablet PC, an ultrabook, a wearable device (e.g., a smartwatch, a smart glass, or a head mounted display (HMD)), a set top box (STB), a DMB receiver, a radio, a washing machine, a refrigerator, an air conditioner, a desk top computer, and a digital signage.

That is, the terminal 100 may be embodied in the form of various home appliances used in the home and may also be applied to a fixed or mobile robot.

The terminal 100 may perform a function of a speech agent. The speech agent may be a program that recognizes user voice and outputs appropriate for the recognized voice in the form of voice.

Referring to FIG. 1, the terminal 100 may include a wireless communication interface 110, an input interface 120, a learning processor 130, a sensor 140, an output interface 150, an interface part 160, a memory 170, a processor 180, and a power supply 190.

A trained model may be installed in the terminal 100.

The trained model may be embodied in hardware, software, or a combination of hardware and software, and when an entire or partial portion of the trained model is embodied in software, one or more commands for configuring the trained model may be stored in the memory 170.

The wireless communication interface 110 may include at least one of a broadcast receiving module 111, a mobile communication module 112, a wireless Internet module 113, a short-range communication module 114, or a location information module 115.

The broadcast receiving module 111 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input interface 120 may include a camera 121 for image signal input, a microphone 122 for receiving audio signal input, and a user input interface 123 for receiving information from a user.

Voice data or image data collected by the input interface 120 are analyzed and processed as a user's control command.

The input interface 120 may acquire input data to be used to acquire output using the trained data and trained model for model learning.

The input interface 120 may acquire input data that is not processed, in which case the processor 180 or the learning processor 130 may pre-process the acquired data and may generate the trained data to be input to the model learning or the pre-processed input data.

In this case, pre-processing of the input data may refer to extraction of an input feature from the input data.

The input interface 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input interface 123 is to receive information from a user and when information is input through the user input interface 123, the processor 180 may control an operation of the mobile terminal 100 to correspond to the input information.

The user input interface 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 may train a model configured by an artificial neural network using the trained data.

In detail, the learning processor 130 may repeatedly train the artificial neural network using the aforementioned various learning schemes, and thus may determine optimized model parameters of the artificial neural network.

In the specification, the artificial neural network, a parameter of which is determined via learning using the trained data, may be referred to as a trained model or a trained model.

In this case, the trained model may be used to infer a result value with respect to new input data, but not the trained data.

The learning processor 130 may be configured to receive, classify, store, and output information which is to be used for data mining, data analysis, intelligent decision, and machine learning algorithms and technologies.

The learning processor 130 may include one or more memory units which are configured to store data received, detected, sensed, generated, pre-defined, or output by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be embodied using positions of the memory 170, a memory 230 of a learning device 200, a memory sustained in a cloud computing environment, or other remote memory to be accessed by a terminal through a communication method such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensor 140.

The processor 180 may receive a broadcast signal and/or broadcast-related information, a wireless signal, and wireless data through the wireless communication interface 110.

The processor 180 may receive image information (or a corresponding signal), audio information (or a corresponding signal), data, or user input information through the input interface 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technique, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensor 140 may include at least one sensor for sensing at least one of information in a mobile terminal, environmental information around a mobile terminal, or user information.

For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output interface 150 is used to generate a visual, auditory, or haptic output and may include at least one of a display 151, a sound output interface 152, a haptic module 153, or an optical output module 154.

The display 151 may display (output) information processed in the mobile terminal 100. For example, the display 151 may display execution screen information of an application program running on the mobile terminal 100 or user interface (UI) and graphic user interface (GUI) information according to such execution screen information.

The display 151 may be formed with a mutual layer structure with a touch sensor or formed integrally, so that a touch screen may be implemented. Such a touch screen may serve as the user input interface 123 providing an input interface between the mobile terminal 100 and a user, and an output interface between the mobile terminal 100 and a user at the same time.

The sound output interface 152 may output audio data received from the wireless communication interface 110 or stored in the memory 170 in a call signal reception or call mode, a recording mode, a voice recognition mode, or a broadcast reception mode.

The sound output interface 152 may include at least one of a receiver, a speaker, or a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface part 160 may serve as a path to various kinds of external devices connected to the mobile terminal 100. The interface part 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface part 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface part 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store the trained model by the learning processor 130 or the learning device 200.

In this case, the memory 170 may store the trained model by dividing the same into multiple versions according to a learning time or learning progress as necessary.

In this case, the memory 170 may store input data acquired by the input interface 120, trained data (or trained data) used for model learning, a learning history of a model, or the like.

In this case, the input data stored in the memory 170 may be not only processed data suitable for model learning, but also raw input data itself.

The processor 180 may control overall operations of the mobile terminal 100 generally besides an operation relating to the application program. The processor 180 may provide appropriate information or functions to a user or process them by processing signals, data, and information input/output through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply 190 may receive external power or internal power under a control of the processor 180 and may then supply power to each component in the mobile terminal 100. The power supply 190 includes a battery and the battery may be a built-in battery or a replaceable battery.

Figure 2:
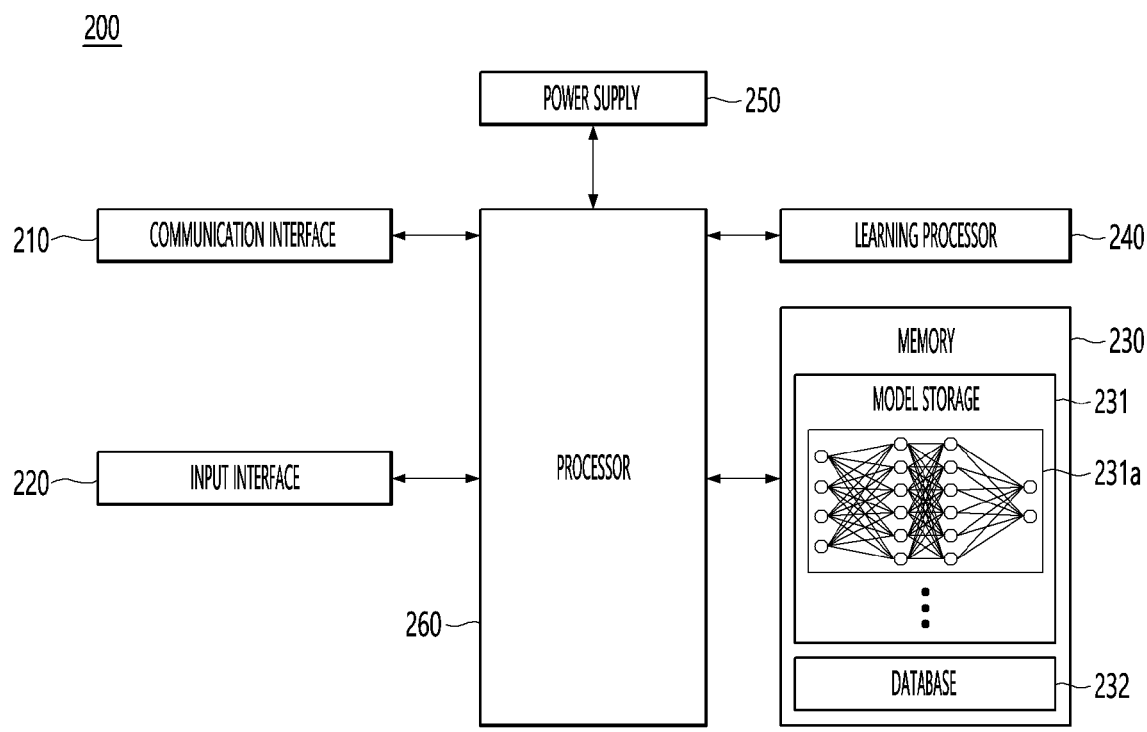
FIG. 2 is a block diagram illustrating a configuration of a learning device 200 of an artificial neural network according to an embodiment of the present disclosure.

FIG. 2 is a block diagram illustrating a configuration of the learning device 200 of an artificial neural network according to an embodiment of the present disclosure.

The learning device 200 may be a device or a server that is separately installed outside the terminal 100 and may perform the same function as the learning processor 130 of the terminal 100.

That is, the learning device 200 may be configured to receive, classify, store, and output information which is to be used for data mining, data analysis, intelligent decision, and machine learning algorithms. Here, the machine learning algorithm may include a deep learning algorithm.

The learning device 200 may communicate with at least one terminal 100 and may derive the result by analyzing or learning data on behalf of or assisting the terminal 100. Here, assisting another device may mean distribution of computing capability through distributed processing.

The learning device 200 of the artificial neural network may refer to various devices for learning the artificial neural network, may generally refer to a server, and may be referred to as a learning device or a learning server.

In particular, the learning device 200 may be implemented not only as a single server, but also as a plurality of server sets, a cloud server, or a combination thereof.

That is, the learning device 200 may be configured in a plural number to configure a learning device set (or a cloud server), and at least one learning device 200 included in the learning device set may derive the result by analyzing or learning data through distributed processing.

The learning device 200 may transmit a model learned by machine learning or deep learning to the terminal 100 periodically or upon request.

Referring to FIG. 2, the learning device 200 may include a communication interface 210, an input interface 220, a memory 230, a learning processor 240, a power supply 250, and a processor 260.

The communication interface 210 may correspond to a configuration encompassing the wireless communication interface 110 and the interface part 160 of FIG. 1. That is, the communication interface 210 may transmit and receive data to and from other devices through wired or wireless communication or an interface.

The input interface 220 may be a component corresponding to the input interface 120 of FIG. 1 and may also acquire data by receiving data through the communication interface 210.

The input interface 220 may acquire input data for acquire output using trained data and a trained model for model learning.

The input interface 220 may acquire non-processed input data, in which case the processor 260 may pre-process the acquired data and may generate the trained data to be input to the model learning or the pre-processed input data.

In this case, pre-processing of the input data by the input interface 220 may refer to extraction of an input feature from the input data.

The memory 230 may be a component corresponding to the memory 170 of FIG. 1.

The memory 230 may include a model storage 231 and a database 232.

The model storage 231 may store a learning or trained model (or an artificial neural network 231*a*) through the learning processor 240 and may store an updated model when the model is updated through learning.

In this case, the model storage 231 may store the trained model by dividing the same into multiple versions according to a learning time or learning progress as necessary.

The artificial neural network 231*a* shown in FIG. 2 is merely an example of an artificial neural network including a plurality of hidden layers, and the artificial neural network according to the present disclosure is not limited thereto.

The artificial neural network 231*a* may be embodied in hardware, software, or a combination of hardware and software. When an entire or partial portion of the artificial neural network 231*a* is embodied in software, one or more commands for configuring the artificial neural network 231*a* may be stored in the memory 230.

The database 232 may store input data acquired by the input interface 220, trained data (or trained data) used for model learning, a learning history of a model, or the like.

The input data stored in the database 232 may be not only processed data suitable for model learning, but also raw input data itself.

The learning processor 240 may be a component corresponding to the learning processor 130 of FIG. 1.

The learning processor 240 may train the artificial neural network 231*a* using trained data or a training set.

The learning processor 240 may immediately acquire data obtained by pre-processing the input data acquired by the processor 260 through the input interface 220 to train the artificial neural network 231*a* or may acquire the pre-processed input data stored in the database 232 to train the artificial neural network 231*a*.

In detail, the learning processor 240 may repeatedly train the artificial neural network 231*a* using the aforementioned various learning schemes, and thus may determine optimized model parameters of the artificial neural network 231*a*.

In the specification, the artificial neural network, a parameter of which is determined via learning using the trained data, may be referred to as a trained model or a trained model.

In this case, the trained model may be used to infer a result value in the state of being installed in the learning device 200 of the artificial neural network and may be transmitted to and installed in another device such as the terminal 100 through the communication interface 210.

When the trained model is updated, the updated trained model may be transmitted to and installed in another device such as the terminal 100 through the communication interface 210.

The power supply 250 may be a component corresponding to the power supply 190 of FIG. 1.

The repeated description of the components corresponding to each other will be omitted.

The term the terminal 100 described in FIG. 1 may be used interchangeably with the term artificial intelligence server 100.

Although training of the artificial neural network has been described as being performed in the learning device 200, it is not limited thereto, and training of the artificial neural network may also be performed by the artificial intelligence server 100.

Figure 3:
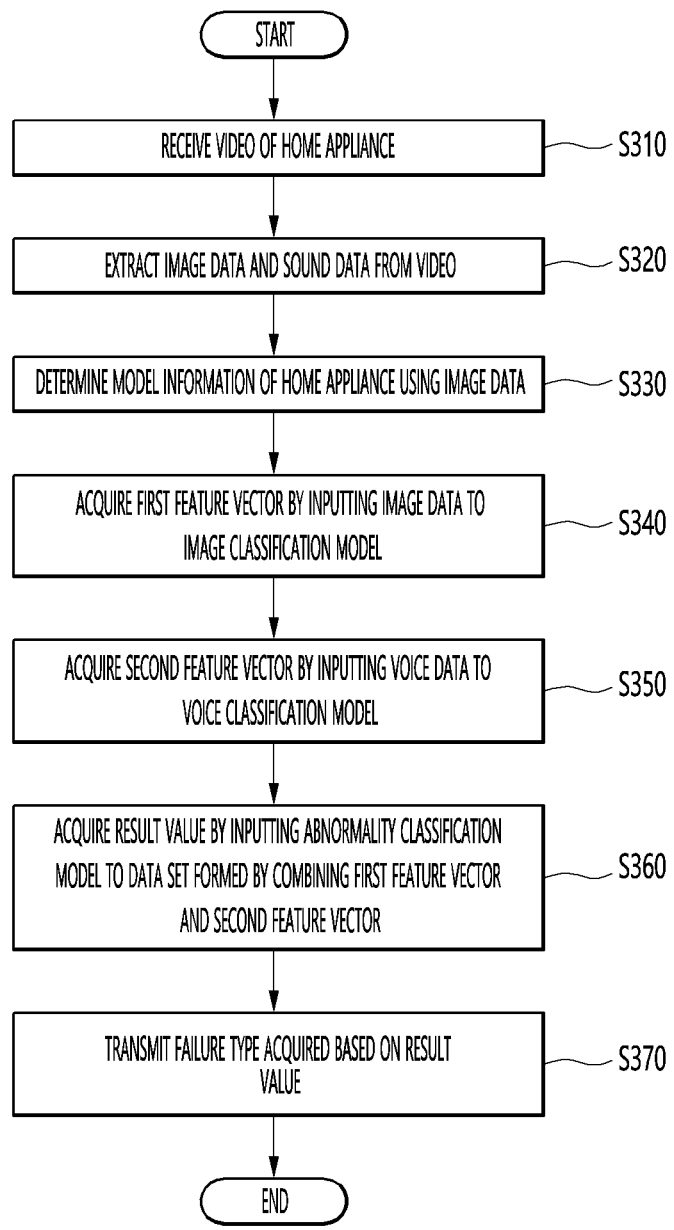
FIG. 3 is a diagram for explaining an operating method of an artificial intelligence server according to an embodiment of the present disclosure.

FIG. 3 is a diagram for explaining an operating method of an artificial intelligence server according to an embodiment of the present disclosure.

The operating method of the artificial intelligence server according to an embodiment of the present disclosure may include receiving a video of a home appliance from a terminal (S310), extracting image data and sound data from the video of the home appliance (S320), acquiring model information of the home appliance using the image data (S330), acquiring a first feature vector by inputting the image data to an image classification model (S340), acquiring a second feature vector by inputting the voice data to a voice classification model (S350), acquiring a result value by inputting a data set obtained by combination of the first feature vector and the second feature vector to an abnormality classification model (S360), and transmitting a failure type acquired based on the result value (S370).

First, the receiving the video of a home appliance from a terminal (S310) will be described with reference to FIG. 4.

Figure 4:
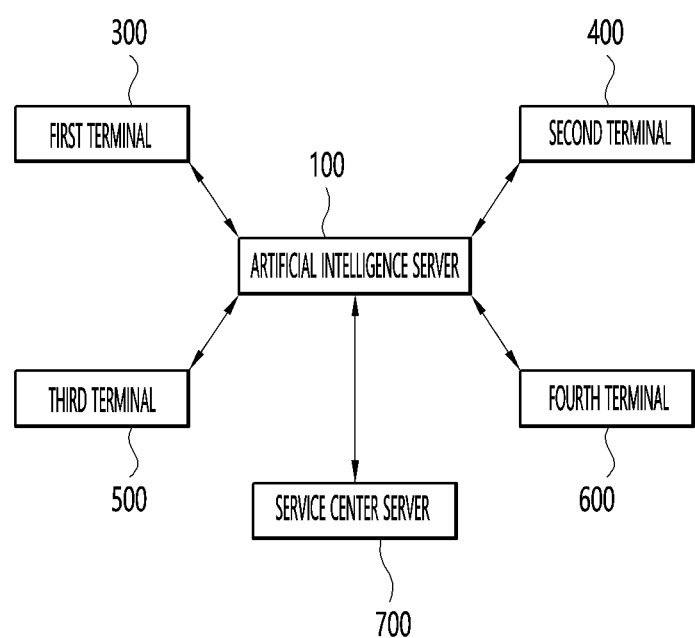
FIG. 4 is a block diagram for explaining a service system according to an embodiment of the present disclosure.

FIG. 4 is a block diagram for explaining a service system according to an embodiment of the present disclosure.

The service system may include an artificial intelligence server 100, one or more terminals 300, 400, 500, and 600, and a service center server 700.

The artificial intelligence server 100 may communicate with the one or more terminals 300, 400, 500, and 600 and may transmit/receive data to/from the one or more terminals 300, 400, 500, and 600. Here, the one or more terminals 300, 400, 500, and 600 may include the components described with reference to FIG. 1 and may perform the function of the terminal described with reference to FIG. 1.

The artificial intelligence server 100 may communicate with the service center server 700 and may transmit/receive data to/from the service center server 700.

A user of a first terminal 300 may capture a video of a home appliance using the first terminal and may control the terminal to transmit the captured video to a server. In this case, the processor of the first terminal 300 may transmit the video of the home appliance to the artificial intelligence server 100.

In this case, the processor 180 of the artificial intelligence server 100 may receive the video of the home appliance from the first terminal 300 through the communication interface 110.

Hereinafter, S320 to S370 will be described with reference to FIGS. 5 and 6.

Figure 5:
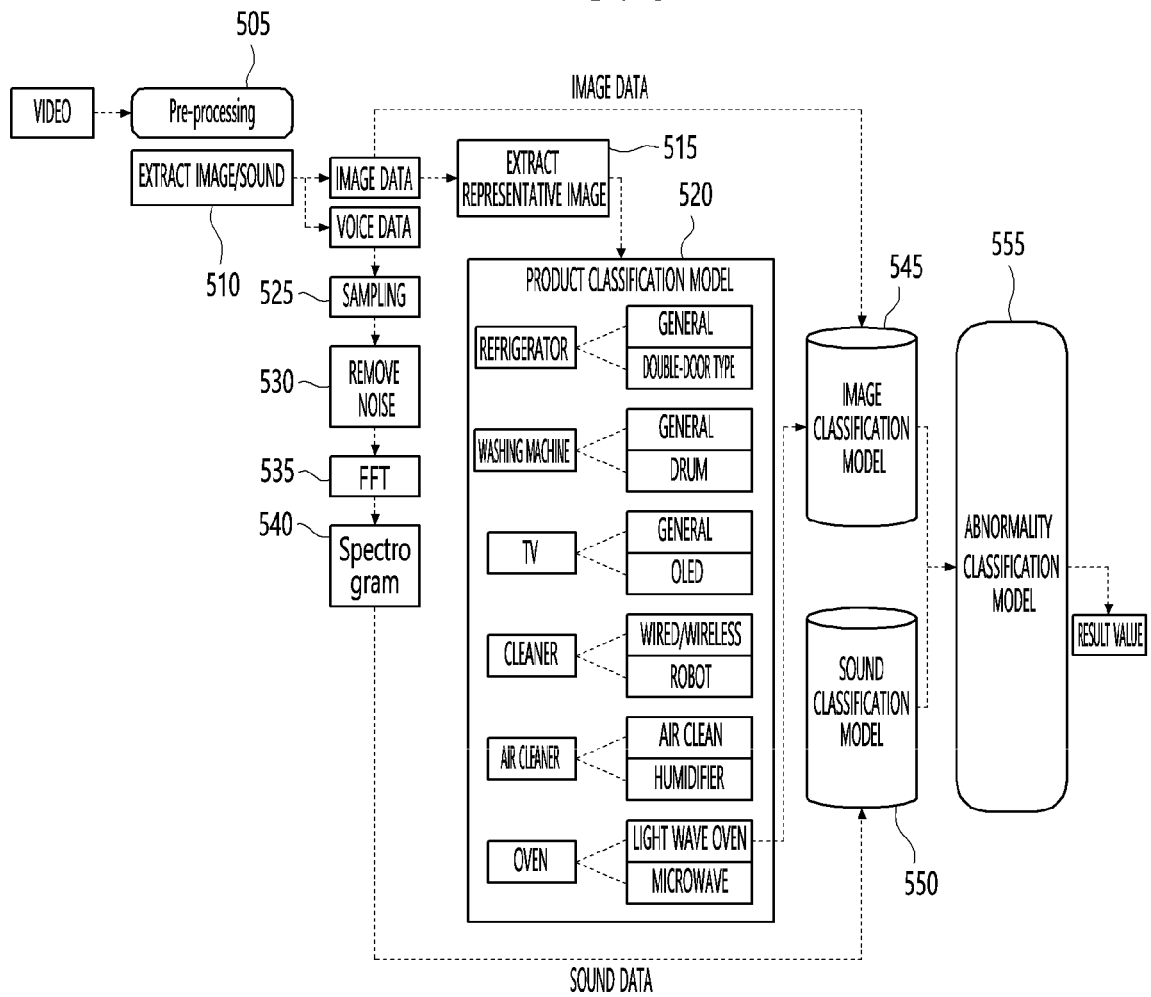
FIG. 5 is a diagram for explaining a method of acquiring a failure type by an artificial intelligence server according to an embodiment of the present disclosure.

FIG. 5 is a diagram for explaining a method of acquiring a failure type by an artificial intelligence server according to an embodiment of the present disclosure.

The processor 180 may pre-process the received video (505) and may extract the image data and the sound data from the received video.

In detail, the received video may be a video of a home appliance and may include image information and sound information. In this case, the processor 180 may extract image data and sound data from the video.

The image data extracted from the video may include only image information without sound information. The image data extracted from the video may also be a video including a combination of a plurality of image frames.

The processor 180 may input sound data to a sound classification model. In this case, the processor 180 may pre-process the sound data and may input the pre-processed sound data to the sound classification model.

In detail, the processor 180 may sample the sound data and may generate a plurality of groups by cutting the sampled sound data in units of a predetermined time. The processor 180 may remove noise from the sound data, and a frequency spectrum may be generated by Fourier transforming sound data to express a sound wave from low to high frequencies (525, 530, 535, and 540).

The processor 180 may acquire model information of a home appliance using the image data.

In detail, the image data may include information on the shape, form, and color of the home appliance. The processor 180 may compare the image data and each piece of image data of a plurality of models pre-stored in a memory and may acquire model information of the home appliance.

The model information of the home appliance may include large classification information. Here, the large classification information may be division of a home appliance according to a type thereof, and for example, model information of the home appliance may be one of a refrigerator, a washing machine, a television, a cleaner, an air cleaner, and an oven.

The model information of the home appliance may include medium classification information. Here, the medium classification information may be subdivision of a home appliance, and for example, model information of the home appliance may be one of a general refrigerator, a double-door refrigerator, a general washing machine, a drum washing machine, a general television, an OLED television, a wired/wireless cleaner, a robot, an air cleaner, a humidifier, a light wave oven, and a microwave.

The model information of the home appliance may include small classification information. Here, the small classification information may be division of a home appliance according to a model thereof, and for example, the model information may be one of a first model name, a second model name, and a third model name.

The processor 180 may acquire model information of a home appliance using a product classification model 520.

Here, the product classification model 520 may be a neural network that is trained by labeling corresponding model information to each image of various home appliances.

In detail, the learning device 200 may train the neural network using the image of the various home appliances as an input value and the model information corresponding to the home appliance as an output value.

In this case, the neural network may infer a function on a relationship between trained data and labeling data using the trained data (images of various home appliances) and the labeling data (model information). The neural network may determine (optimize) a parameter of the neural network through evaluation of the inferred function.

As such, the neural network trained using the trained data (the images of various home appliances) and the labeling data (model information) may be referred to as the product classification model 520.

The product classification model 520 may be installed in the artificial intelligence server 100.

The processor 180 may input image data to the product classification model 520. In this case, the product classification model 520 may predict and output model information corresponding to the input image data.

The processor 180 may acquire model information of the home appliance using a representative image.

In detail, the processor 180 may extract the representative image from the image data (515). Here, the representative image may be a still image. The processor 180 may acquire model information of the home appliance by inputting the representative image to the product classification model 520.

The processor 180 may acquire model information of the home appliance using the image data and may input the image data and the voice data to a failure determination model corresponding to the model information.

In detail, the failure determination model may include a plurality of failure determination models that correspond to a plurality of pieces of model information, respectively.

For example, the failure determination model may include a first failure determination model corresponding to first model information (e.g., a first model name), a second failure determination model corresponding to second model information (e.g., a second model name), a third failure determination model corresponding to third model information (e.g., a light wave oven), and a fourth failure determination model corresponding to fourth model information (e.g., a refrigerator).

Here, the first failure determination model may be a model trained to determine failure of a home appliance corresponding to the first model information. In another example, the fourth failure determination model may be a model trained to determine failure of a home appliance corresponding to the fourth model information.

The processor 180 may input the image data and the voice data to the failure determination model corresponding to the acquired model information.

The processor 180 may transmit the acquired model information to a terminal of a user.

The failure determination model may include an image classification model 545, a sound classification model 550, and an abnormality classification model 555.

The image classification model 545, the sound classification model 550, and the abnormality classification model 555 will be described in detail with reference to FIG. 6.

FIG. 6 is a diagram for explaining a training method of a failure determination model according to an embodiment of the present disclosure.

First, with reference to FIG. 6A, a training method of the image classification model 545 will be described.

The image classification model 545 may be a neural network 610 that is trained using image data of a video of a home appliance and a failure type labeled to the image data.

Here, the failure type may mean a cause that causes non-operation or performance degradation of an electronic device, or a situation in which the electronic device does not operate or performance thereof is degraded.

As an example of a dishwasher, the failure type may include a clogged water filter, a frozen water hose, a kinked water hose, a leaked water hose, a poor water valve, a blocked drain filter, a frozen drain hose, poor drain hose installation, a leaked drain hose, and a kinked drain hose.

As an example of a refrigerator, the failure type may include defect in connection between a door and a main body, and an insufficient refrigerant in a compressor.

The learning device 200 may generate the image classification model 545 by training the neural network 610 using the image data of the video of a home appliance and a failure type labeled to the image data.

In more detail, the learning device 200 may train the neural network 610 using the image data extracted from the video of the home appliance as an input value and the failure type generated from the photographed home appliance as an output value.

In this case, the neural network 610 may infer a function on a relationship between the trained data and the labeling data using the trained data (image data extracted from the video of a home appliance) and the labeling data (a failure type). The neural network 610 may determine (optimize) a parameter of the neural network 610 through evaluation of the inferred function.

As such, the neural network 610 trained using the trained data (image data extracted from the video of the home appliance) and the labeling data (a failure type) may be referred to as the image classification model 545.

The image classification model 545 generated as such may receive the image data extracted from the video and may output a first feature vector corresponding to the received image data.

Hereinafter, with referenced to FIG. 6B, a training method of the sound classification model 550 will be described.

The sound classification model 550 may be a neural network 620 that is trained using sound data of the video of the home appliance and the failure type labeled to the sound data.

The learning device 200 may generate the sound classification model 550 by training the neural network 620 using the sound data of the video of the home appliance and the failure type labeled to the sound data.

In more detail, the learning device 200 may train the neural network 620 using the sound data extracted from the video of the home appliance as an input value and the failure type generated from the photographed home appliance as an output value.

In this case, the neural network 620 may infer a function on a relationship between trained data and labeling data using the trained data (sound data extracted from the video of the home appliance) and the labeling data (a failure type). The neural network 620 may determine (optimize) a parameter of the neural network 620 through evaluation of the inferred function.

As such, the neural network 620 trained using the trained data (sound data extracted from the video of the home appliance) and the labeling data (a failure type) may be referred to as the sound classification model 550.

The sound classification model 550 generated as such may receive the sound data extracted from the video and may output a second feature vector corresponding to the received sound data.

Hereinafter, with reference to FIG. 6C, a training method of the abnormality classification model 555 will be described.

The abnormality classification model 555 may be a neural network trained using a data set formed by combining a first feature vector output from the image classification model 545 and a second feature vector output from the sound classification model 550 and a failure type labeled to the data set.

In detail, the learning device 200 may generate the abnormality classification model 555 by training a neural network 630 using the data set formed by combining the first feature vector output from the image classification model and the second feature vector output from the voice classification model and the failure type labeled to the data set.

In more detail, the learning device 200 may train a neural network by labeling a first failure type of a plurality of failure types to the data set formed by combining the first feature vector and the second feature vector. When the first failure type is labeled, the first feature vector included in the data set may be a feature vector output from the image classification model based on a video of a home appliance in which failure of the first failure type occurs. When the first failure type is labeled, the second feature vector included in the data set may be a feature vector output from the voice classification model based on the video of the home appliance in which failure of the first failure type occurs.

The first feature vector may include information on a probability of occurrence of one or more failure types inferred based only on image data. For example, the image classification model may output a first feature vector including information indicating that a probability that the failure type of the home appliance is a first failure type is 70%, a probability that the failure type of the home appliance is a second failure type is 30%, and a probability that the failure type of the home appliance is a third failure type is 0% using the image data of the home appliance in which failure of the first failure type occurs.

The second feature vector may include information on a probability of occurrence of one or more failure types inferred based on only sound data. For example, the sound classification model may output a second feature vector including information indicating that a probability that the failure type of the home appliance is a first failure type is 40%, a probability that the failure type of the home appliance is a second failure type is 40%, and a probability that the failure type of the home appliance is a third failure type is 20% using sound data of the home appliance in which failure of the first failure type occurs.

In this case, the learning device 200 may train a neural network by labeling the first failure type of a plurality of failure types to a data set formed by combing the first feature vector and the second feature vector.

When the above training is repeatedly performed on a video of a home appliance in which failure of various failure types occurs, the neural network 630 may infer a function on a relationship between trained data (a data set formed by combining the first feature vector and the second feature vector) and labeling data (a failure type). The neural network 630 may determine (optimize) a parameter of the neural network 630 through evaluation of the inferred function.

As such, the neural network 630 that is trained using the trained data (the data set formed by combining the first feature vector and the second feature vector) and the labeling data (a failure type) may be referred to as the abnormality classification model 555.

The abnormality classification model 555 generated as such may receive the data set formed by combining the first feature vector and the second feature vector and may output a result value (a failure type, or a probability value of one or more failure types) corresponding to the video received from the terminal.

A method of labeling a failure type to the data set formed by combining the first feature vector and the second feature vector may be a method of training a neural network by providing a correct answer to the neural network 630.

The neural network 630 may be trained by also providing an incorrect answer to the neural network 630, thereby improving the prediction accuracy of the abnormality classification model 555.

In detail, the learning device 200 may train the neural network 630 by labeling error information to the data set formed by combining the first feature vector and the second feature vector. In this case, the first feature vector may be a feature vector output from the image classification model based on a video of a home appliance in a normal state, and the second feature vector may be a feature vector output from the voice classification model based on the video of the home appliance in the normal state.

That is, both the first feature vector and the second feature vector may be acquired based on a video of a home appliance in which failure does not occur, and thus the learning device 200 may improve prediction accuracy by providing information indicating that the data set is an incorrect answer to the neural network.

The learning device 200 may train the neural network 630 by labeling error information to the data set formed by combining the first feature vector and the second feature vector. In this case, the first feature vector may be a feature vector output from the image classification model based on a video of a home appliance in which failure of the first failure type occurs, and the second feature vector may be a feature vector output from the voice classification model based on a video of a home appliance in which failure of the second failure type occurs.

That is, the first feature vector and the second feature vector may be feature vectors acquired based on videos of home appliances in which different types of failures occur. Thus, information indicating that the data set formed by combining the first feature vector and the second feature vector is an incorrect answer may be provided to the neural network, thereby improving prediction accuracy.

Referring back to FIG. 5, an operation of the artificial intelligence server 100 will be described again.

The processor 180 may acquire the first feature vector by inputting the image data extracted from the video to the image classification model. In detail, the processor 180 may input the image data to the image classification model 545. In this case, the image classification model 545 may output the first feature vector corresponding to the input image data. Here, the first feature vector may include information on a probability of occurrence of one or more failure types inferred based on only the image data.

The processor 180 may acquire the second feature vector by inputting the sound data extracted from the video to the sound classification model. In detail, the processor 180 may input the sound data to the sound classification model 550. In this case, the sound classification model 550 may output the second feature vector corresponding to the input sound data. In this case, the second feature vector may include information on a probability of occurrence of one or more failure types inferred based on only the sound data.

The processor 180 may acquire a result value by inputting the data set formed by combining the first feature vector and the second feature vector to the abnormality classification model. In detail, the processor 180 may input the data set formed by combining the first feature vector and the second feature vector to the abnormality classification model 555. In this case, the abnormality classification model 555 may output the result value corresponding to the input data set. In this case, the result value may include information on a probability of occurrence of one or more failure types inferred by overall consideration of information on the probability of occurrence on one or more failure types inferred based on only the image data and a probability of occurrence of one or more failure types inferred based on only the sound data.

The processor 180 may transmit the failure type acquired based on the result value to a terminal of a user.

In detail, the processor 180 may determine a failure type of failure that occurs in a home appliance based on the probability of occurrence of one or more failure types and may transmit the determined failure type to a terminal that transmits a video.

In this case, the processor 180 may transmit a problem solution corresponding to a failure type along with the failure type.

As such, according to the present disclosure, a user may be advantageously provided with diagnosis of a failure type simply by capturing and transmitting a video of a home appliance in which failure occurs.

There may be a failure type that is not capable of being determined only with an image, and there may be a failure type that is not capable of being determined only with voice. In addition, there may be a case in which it is difficult to accurately determine a failure type only with the image, and there may be a case in which it is difficult to accurately determine a failure type only with voice. However, according to the present disclosure, since a failure type is determined in consideration of both the image and the voice of a home appliance in which failure occurs, advantageously, the accuracy of diagnosis of a failure type may be improved or a failure type that is not capable of being determined only with the image or the voice.

According to the present disclosure, a failure type may not be diagnosed using a video itself, and instead, a failure type may be predicted by extracting the first feature vector based on image data and the second feature vector based on voice data and then inputting the image data and the voice data to the abnormality classification model again. That is, refined data may be input to the abnormality classification model, thereby advantageously improving prediction accuracy.

When a failure type is not acquired, the processor 180 may transmit a video to the service center server 700.

Here, when the failure type is not acquired, this means that the abnormality classification model outputs error information or the abnormality classification model outputs a probability value of one or more failure types but the probability value is lower than a preset value.

The service center server 700 may receive a video. A service center repairman may determine a failure type by watching the video or directly watching the home appliance. The service center server 700 may transmit information on the determined failure type to the artificial intelligence server 100.

In this case, the processor 180 may receive information on a failure type (i.e., a failure type determined by a repairman) corresponding to the video transmitted from the service center server 700. In this case, the processor 180 may train a failure determination model (an image classification model, a sound classification model, and an abnormality classification model) using the video and the received failure type.

In detail, the processor 180 may train the image classification model by labeling the received failure type to the image data of the video. The processor 180 may train the sound classification model by labeling the received failure type to the sound data of the video. In addition, the processor 180 may train the abnormality classification model by labeling the received failure type to the data set formed by combining the first feature vector output from the trained image classification model and the second feature vector output from the trained sound classification model.

Figure 7:
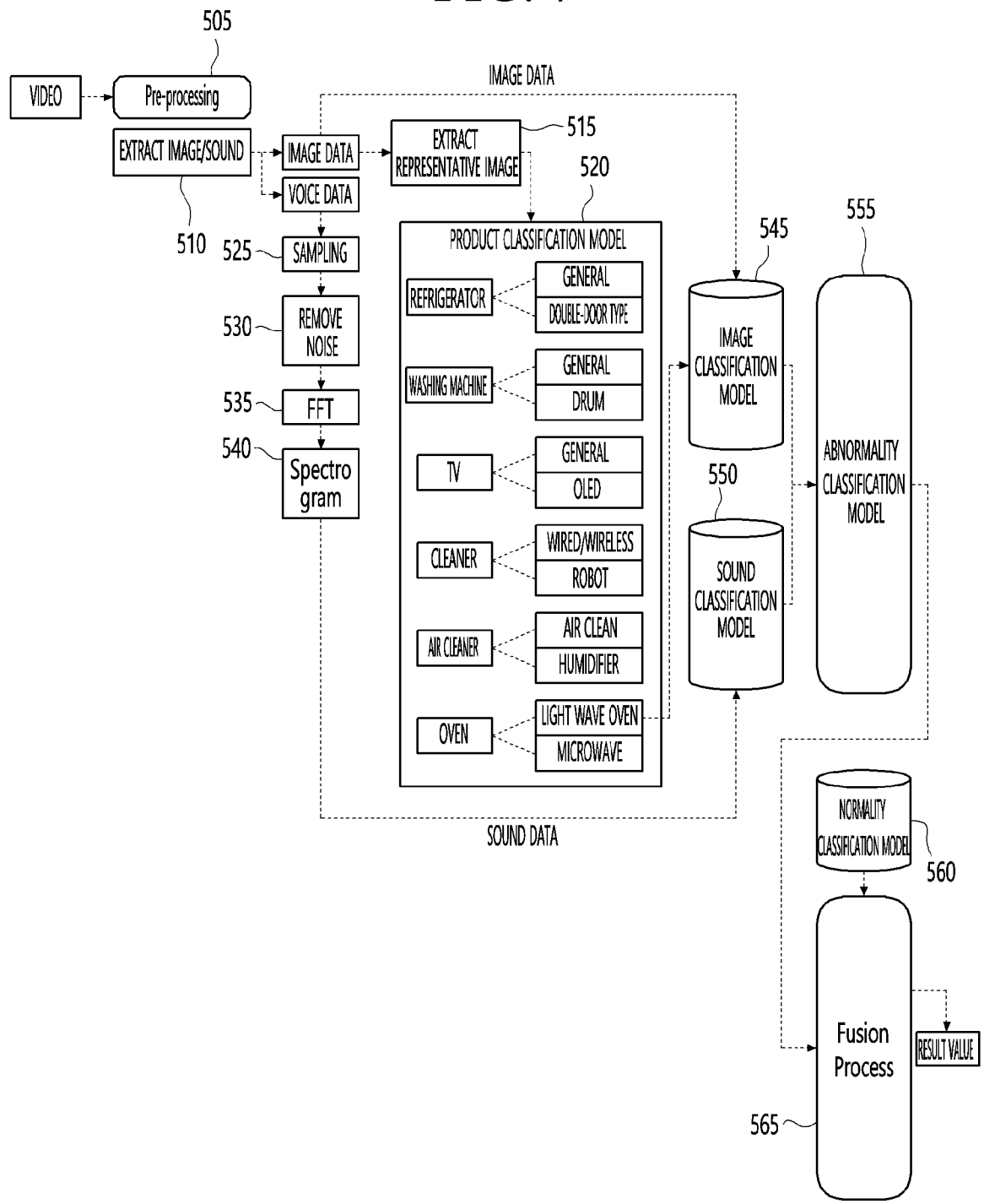
FIG. 7 is a diagram for explaining a method of determining whether failure occurs and acquiring a failure type by an artificial intelligence server according to another embodiment of the present disclosure.

FIG. 7 is a diagram for explaining a method of determining whether failure occurs and acquiring a failure type by an artificial intelligence server according to another embodiment of the present disclosure.

The description of FIGS. 5 to 6 may be applied to the present embodiment, and only content that is different from or added to FIGS. 5 to 6 will be described.

The processor 180 may acquire a second result value by inputting the video to a normality classification model 560 and may determine whether failure occurs using a result value (a result value output from the abnormality classification model) and a second result value (a result value output from the normality classification model).

Here, the normality classification model 560 may be a neural network that is trained using a video of a home appliance in a normal state and normal operation information labeled to the video of the home appliance in the normal state.

This will be described with reference to FIG. 8.

Figure 8:
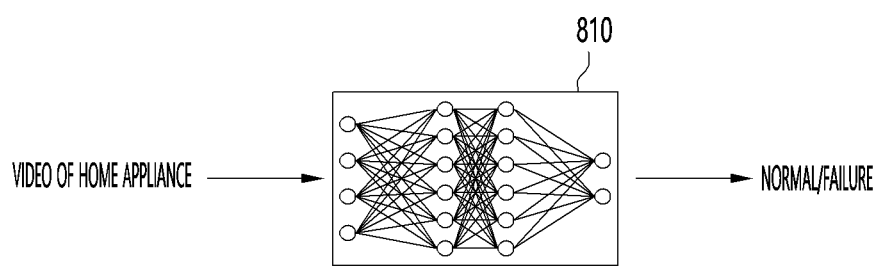
FIG. 8 is a diagram for explaining a training method of a normality classification model 560 according to an embodiment of the present disclosure.

FIG. 8 is a diagram for explaining a training method of the normality classification model 560 according to an embodiment of the present disclosure.

The learning device 200 may train a neural network 810 by labeling the normal operation information to a video of a home appliance in a normal state and thus may generate the normality classification model 560.

In detail, the learning device 200 may train the neural network 810 using the image data extracted from the video of the home appliance in the normal state as an input value and the normal operation information as an output value.

In this case, the neural network 810 may infer a function on a relationship between trained data and labeling data using the trained data (a video of a home appliance in a normal state) and the labeling data (normal operation information). The neural network 810 may determine (optimize) a parameter of the neural network 810 through evaluation of the inferred function.

As such, the neural network 810 that is trained using the trained data (a video of a home appliance in a normal state) and the labeling data (normal operation information) may be referred to as the normality classification model 560.

A method of labeling normal operation information to a video of a home appliance in a normal state may be a method of training a neural network by providing a correct answer to the neural network 810.

The neural network 810 may be trained by also providing an incorrect answer to the neural network 810, thereby improving the prediction accuracy of the normality classification model 560.

In detail, the learning device 200 may train the neural network 810 by labeling failure information to a video of a home appliance in which failure occurs.

That is, the learning device 200 may train the neural network 810 using both correct answer data and incorrect answer data.

Referring back to FIG. 7, the processor 180 may acquire a second result value by inputting a video to the normality classification model 560. Here, the second result value may include information on a probability that a home appliance included in the video is in a normal state.

The processor may determine whether failure occurs using a result value (a result value output from the abnormality classification model) and a second result value (a result value output from the normality classification model).

For example, it may be assumed that the abnormality classification model outputs information indicating that a probability of the first failure type is 80%, and a probability of the second failure type is 20%, and the normality classification model outputs a probability of the normal operation state is 10%. In this case, the probability of the normal operation state is very low, and the probability of the first failure type is very high, and accordingly, the processor may determine that failure occurs in the home appliance and may acquire the first failure type.

In another example, it may be assumed that the abnormality classification model outputs information indicating that a probability of the first failure type is 30%, a probability of the second failure type is 30%, and a probability of the third failure type is 20%, and a probability of the fourth failure type is 20%, and the normality classification model outputs information indicating that a probability of the normal operation state is 80%. In this case, the probability of the normal operation state is very high, and entropy of a probability of failure types is high, and accordingly, the processor may determine that failure does not occur in the home appliance.

When determining that failure does not occur in the home appliance, the processor may transmit information indicating that failure does not occur to a terminal of a user.

As such, according to the present disclosure, the probability of the normal operation state may be additionally predicted and may be used to determine whether failure occurs, thereby advantageously improving prediction accuracy.

For example, when noise is generated in a refrigerator, the noise may be due to a malfunction (e.g., lack of a refrigerant in a compressor) or may be a normal operation (e.g., a natural phenomenon due to aging of a product). When whether failure occurs is determined using only the abnormality classification model, a probability that the abnormality classification model outputs the cause of noise is an insufficient refrigerant in a compressor may be high. However, according to the present disclosure, advantageously, whether failure occurs may be accurately diagnosed using an output value of the normality classification model along with an output value of the abnormality classification model.

Figure 9:
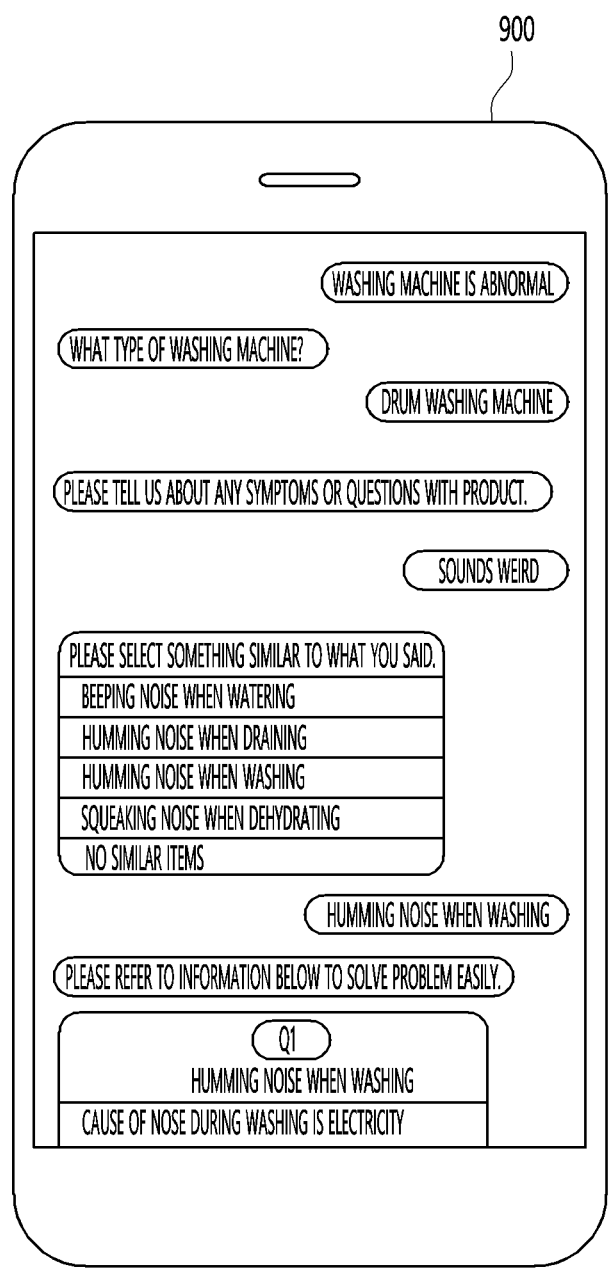
FIGS. 9 to 10 are diagrams for comparison of a chatbot service between a conventional method and the present disclosure.
Figure 10:
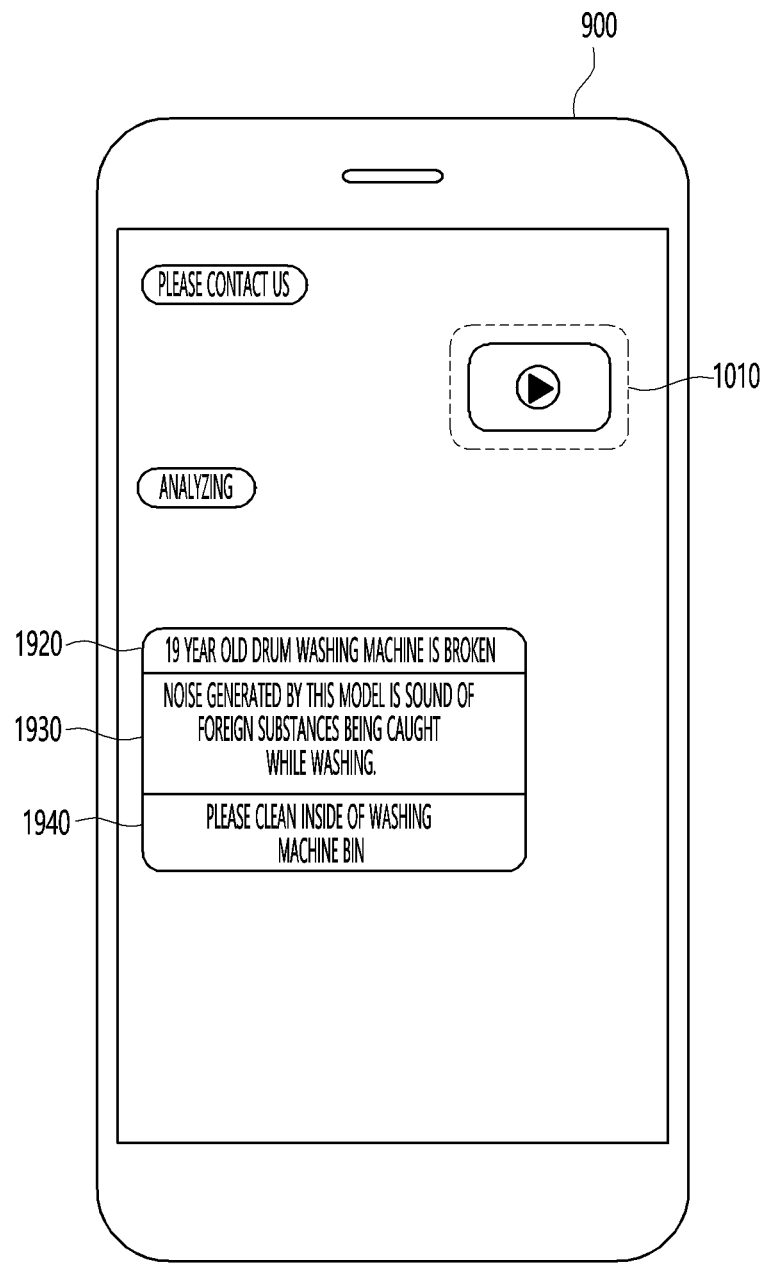

FIGS. 9 to 10 are diagrams for comparison of a chatbot service between a conventional method and the present disclosure.

Referring to FIG. 9, a conventional chatbot service is a method of recognizing a failure type while questions and answers through a text are repeated. However, there is a limitation in that it is difficult to accurately convey the state of a home appliance with a text, and there is a problem that many questions and answers are required to convey the state of the home appliance.

Referring to FIG. 10, a user may transmit a video 1010 to the artificial intelligence server 100 through a terminal 900.

In this case, the terminal 900 may receive model information 1920 from the artificial intelligence server 100 and may display the model information 1920.

The terminal 900 may receive a failure type 1930 from the artificial intelligence server 100 and may display the failure type 1930.

The terminal 900 may receive a problem solution corresponding to a failure type from the artificial intelligence server 100 and may display the problem solution.

As such, according to the present disclosure, a user may be advantageously provided with diagnosis of a type of failure and a problem solution through a simple operation of capturing and transmitting a video of a home appliance in which failure occurs.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the artificial intelligence apparatus. Accordingly, the above detailed description should not be construed as being restrictive in all aspects but as exemplary. The scope of the present disclosure should be determined by reasonable interpretation of the appended claims, and all modifications within the equivalent scope of the present disclosure are included in the scope of the present disclosure.

The invention claimed is:

1. An artificial intelligence server comprising:
a communication interface configured to communicate with a terminal; and
a processor configured to:
receive, from the terminal through the communication interface, a video of a home appliance,
acquire a first feature vector by inputting image data extracted from the video to an image classification model,
acquire a second feature vector by inputting sound data extracted from the video to a voice classification model,
acquire a result value by inputting a data set obtained by combining the first feature vector and the second feature vector to an abnormality classification model, and
transmit, to the terminal through the communication interface, a failure type acquired based on the result value,
wherein the first feature vector includes first information regarding a probability of occurrence of one or more first failure types that are inferred based only on the image data,
wherein the second feature vector includes second information regarding a probability of occurrence of one or more second failure types that are inferred based only on the sound data, and
wherein the processor is configured to, based on the result value inferred based on the first information and the second information, determine the failure type.

2. The artificial intelligence server of claim 1,
wherein the image classification model is a neural network trained using the image data of the video of the home appliance and a failure type labeled to the image data, and
wherein the voice classification model is a neural network trained using the sound data of the video of the home appliance and a failure type labeled to the sound data.

3. The artificial intelligence server of claim 1, wherein the abnormality classification model is a neural network trained using (i) the data set obtained by combining the first feature vector output from the image classification model and the second feature vector output from the voice classification model and (ii) a failure type labeled to the data set.

4. The artificial intelligence server of claim 1, wherein the processor is configured to:
acquire model information of the home appliance using the image data, and
input the image data and the sound data to a failure determination model corresponding to the model information.

5. The artificial intelligence server of claim 1, wherein the processor is configured to:
acquire a second result value by inputting the video to a normality classification model, and
determine whether failure occurs using the result value and the second result value.

6. The artificial intelligence server of claim 5, wherein the normality classification model is a neural network trained using (i) a video of the home appliance in a normal state and (ii) normal operation information labeled to the video of the home appliance in the normal state.

7. The artificial intelligence server of claim 1, wherein the processor is configured to, based on the failure type not being acquired, transmit the video to a service center server through the communication interface.

8. The artificial intelligence server of claim 7, wherein the processor is configured to:
receive, from the service center server through the communication interface, a failure type corresponding to the transmitted video, and
train a failure determination model using the video and the received failure type.

9. A method of generating a failure determination model, the method comprising:
generating an image classification model by training a first neural network using image data of a video of a home appliance and a failure type labeled to the image data;
generating a voice classification model by training a second neural network using sound data of the video of the home appliance and a failure type labeled to the sound data; and
generating an abnormality classification model by training a third neural network using (i) a data set obtained by combining a first feature vector that is output from the image classification model and a second feature vector that is output from the voice classification model and (ii) a failure type labeled to the data set,
wherein the first feature vector includes first information regarding a probability of occurrence of one or more first failure types that are inferred based only on the image data,
wherein the second feature vector includes second information regarding a probability of occurrence of one or more second failure types that are inferred based only on the sound data,
wherein the abnormality classification model infers a result value based on the first information and the second information, and
wherein a failure type is determined based on the result value.

10. The method of claim 9, wherein generating the abnormality classification model includes:
training the third neural network by labeling a first failure type among a plurality of failure types to the data set,
wherein the first feature vector is a feature vector output from the image classification model based on a video of the home appliance in which a failure of the first failure type occurs, and
wherein the second feature vector is a feature vector output from the voice classification model based on the video of the home appliance in which the failure of the first failure type occurs.

11. The method of claim 9, wherein training the abnormality classification model includes:
training the third neural network by labeling error information to the data set,
wherein the first feature vector is a feature vector output from the image classification model based on a video of the home appliance in a normal state, and
wherein the second feature vector is a feature vector output from the voice classification model based on the video of the home appliance in the normal state.

12. The method of claim 9, wherein training the abnormality classification model includes:
training the third neural network by labeling error information to the data set obtained by combining the first feature vector and the second feature vector,
wherein the first feature vector is a feature vector output from the image classification model based on a video of the home appliance in which a failure of a first failure type occurs, and
wherein the second feature vector is a feature vector output from the voice classification model based on a video of the home appliance in which a failure of a second failure type occurs.

13. The method of claim 9, further comprising:
generating a normality classification model by labeling normal operation information to a video of the home appliance in a normal state to train a fourth neural network.

14. A method of determining a failure type of a home appliance,
the method comprising:
receiving, from a terminal, a video of the home appliance;
acquiring a first feature vector by inputting image data extracted from the video to an image classification model;
acquiring a second feature vector by inputting sound data extracted from the video to a voice classification model;
acquiring a result value by inputting a data set obtained by combining the first feature vector and the second feature vector to an abnormality classification model; and
determining a failure type of the home appliance based on the result value,
wherein the first feature vector includes first information regarding a probability of occurrence of one or more first failure types that are inferred based only on the image data,
wherein the second feature vector includes second information regarding a probability of occurrence of one or more second failure types that are inferred based only on the sound data, and
wherein the determination of the failure type includes determining the failure type based on the result value inferred based on the first information and the second information.

15. The method of claim 14,
wherein the image classification model is a neural network trained using the image data of the video of the home appliance and a failure type labeled to the image data, and
wherein the voice classification model is a neural network trained using the sound data of the video of the home appliance and a failure type labeled to the sound data.

16. The method of claim 14, wherein the abnormality classification model is a neural network trained using (i) the data set obtained by combining the first feature vector output from the image classification model and the second feature vector output from the voice classification model and (ii) a failure type labeled to the data set.

17. The method of claim 14, further comprising:
acquiring model information of the home appliance using the image data; and
inputting the image data and the sound data to a failure determination model corresponding to the model information.

18. The method of claim 14, further comprising:
acquiring a second result value by inputting the video to a normality classification model; and
determining whether failure occurs using the result value and the second result value.

19. The method of claim 18, wherein the normality classification model is a neural network trained using (i) a video of the home appliance in a normal state and (ii) normal operation information labeled to the video of the home appliance in the normal state.

20. The method of claim 14, further comprising:
transmitting, based on the failure type not being determined, the video to a service center server;
receiving, from the service center server, a failure type corresponding to the transmitted video; and
training a failure determination model using the video and the received failure type.

* * * * *